US009206867B2

(12) United States Patent
Lou et al.

(10) Patent No.: US 9,206,867 B2
(45) Date of Patent: Dec. 8, 2015

(54) PAD CLIP WITH NONLINEAR STIFFNESS

(71) Applicant: AKEBONO BRAKE INDUSTRY CO., LTD., Chuo-ku, Tokyo (JP)

(72) Inventors: Gang Lou, Rochester, MI (US); Brian Lewis Boyle, Farmington Hills, MI (US); Eric John Roszman, Farmington Hills, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/188,980

(22) Filed: Feb. 25, 2014

(65) Prior Publication Data

US 2015/0240890 A1 Aug. 27, 2015

(51) Int. Cl.
F16D 65/097 (2006.01)
F16D 65/12 (2006.01)
F16D 65/00 (2006.01)

(52) U.S. Cl.
CPC ............ *F16D 65/122* (2013.01); *F16D 65/005* (2013.01); *F16D 65/0006* (2013.01)

(58) Field of Classification Search
USPC .......................................... 188/73.36–73.38
See application file for complete search history.

(56) References Cited

U.S. PATENT DOCUMENTS

| 4,506,767 | A | 3/1985 | Inoue et al. |
| 4,611,693 | A | 9/1986 | Wang |
| 5,109,959 | A | 5/1992 | Kondo et al. |
| 5,427,213 | A | 6/1995 | Weiler et al. |
| 5,515,950 | A | 5/1996 | Kwolek |
| 5,649,610 | A | 7/1997 | Shimazaki et al. |
| 5,699,882 | A | 12/1997 | Ikegami et al. |
| 5,941,348 | A | 8/1999 | Matsumoto et al. |
| 5,947,233 | A | 9/1999 | Kobayashi et al. |
| 6,003,642 | A | * 12/1999 | Mori et al. ................. 188/73.44 |
| 6,056,091 | A | 5/2000 | Krug et al. |
| 6,186,288 | B1 | 2/2001 | Baba et al. |
| 6,269,915 | B1 | 8/2001 | Aoyagi |
| 6,286,636 | B1 | 9/2001 | Iwata |
| 6,478,122 | B1 | 11/2002 | Demoise, Jr. et al. |
| 6,527,090 | B1 | 3/2003 | Barillot et al. |

(Continued)

FOREIGN PATENT DOCUMENTS

DE 19956968 A1 5/2000
EP 2299142 A1 3/2011

(Continued)

OTHER PUBLICATIONS

Extended European Search Report for European Application No. 15151150.8 dated Jul. 9, 2015.

*Primary Examiner* — Christopher Schwartz
(74) *Attorney, Agent, or Firm* — The Dobrusin Law Firm, P.C.

(57) ABSTRACT

A pad clip comprising: two opposing legs separated by a gap, the two opposing legs comprising: (i) a projection arm including: (A) an upper portion, (B) a lower portion, and (C) a face portion connecting the upper portion and the lower portion together; (ii) a connection arm; and (iii) an abutment arm extending between and connecting the projection arm and the connection arm; wherein the lower portion of the projection arm, the connection arm, or both include an arcuate segment that extends the lower portion, the connection arm, or both towards each other so that when the pad clip is installed in a support bracket a space is formed between the arcuate segment and the support bracket.

20 Claims, 6 Drawing Sheets

(56) References Cited

U.S. PATENT DOCUMENTS

| | | |
|---|---|---|
| D483,709 S | 12/2003 | Byrd et al. |
| D489,655 S | 5/2004 | Byrd et al. |
| 7,308,974 B2 | 12/2007 | Barbosa et al. |
| 7,513,340 B2 | 4/2009 | Hendrich et al. |
| 7,644,809 B2 | 1/2010 | Cortinovis et al. |
| 7,784,591 B2 | 8/2010 | Franz et al. |
| 8,020,674 B2 * | 9/2011 | Miura et al. ............... 188/73.38 |
| 8,292,043 B2 | 10/2012 | Sekiya et al. |
| 2005/0274579 A1 | 12/2005 | Nogiwa |
| 2007/0205061 A1 | 9/2007 | Yagi |
| 2007/0227839 A1 | 10/2007 | Barrett et al. |
| 2011/0120821 A1 | 5/2011 | Shimamura |
| 2013/0180810 A1 | 7/2013 | Schroeter et al. |

FOREIGN PATENT DOCUMENTS

| | | |
|---|---|---|
| GB | 2172068 A | 9/1986 |
| JP | 201234955 A | 8/2001 |
| WO | 2010/005008 A1 | 1/2010 |
| WO | 2013/119391 A1 | 8/2013 |
| WO | 2014199881 A1 | 12/2014 |

* cited by examiner

PAD CLIP WITH NONLINEAR STIFFNESS

FIELD

The present teachings relate to a pad clip that includes one or more features that increase in stiffness to dampen and/or eliminate contact between a brake pad and a support bracket.

BACKGROUND

The present teachings are predicated upon providing an improved pad dip for use in a disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, or the like. However, the present teachings are most suitable for use with a passenger vehicle (e.g., a car, truck, sports utility vehicle, or the like).

Generally, a braking system includes a rotor, a caliper body, a support bracket, an inboard brake pad, and an outboard brake pad that are on opposing sides of the rotor. The caliper body further includes one or more fingers (with or without a piston), one or more piston bores, and a bridge that connects the one or more fingers to the piston bore or two opposing piston bores together. The piston bore houses a piston. The piston bore has a bore axis that the piston moves along during a brake apply and a brake retract. The piston bore may include a fluid inlet, a closed wall, a front opening, and a cylindrical side wall that includes a seal groove located near the front opening. Typically, the fluid inlet is located in the closed wall of the piston bore so that when pressure is applied the fluid will flow into the piston bore. During a pressure apply the fluid will push the piston towards the front opening and into contact with a brake pad that generally includes a pressure plate and friction material and the friction material will contact the rotor on one side and an opposing brake pad will contact the rotor on an opposing side creating friction to stop rotation of the rotor and any component connected to the brake system. The brake pads may slide on an abutment along an axis of the pistons or the brake pads may include holes that receive pins and the brake pads may slide on pins that extend through the brake system so that a friction force may be created. During non-braking conditions (i.e., running) the brake pads may move within the brake system and contact other components of the brake system such as a support bracket causing a rattling noise that may be heard by a user and/or an occupant of a vehicle.

In these non-braking conditions when the brake system is moving the brake system experiences forces that may move one or more components of the brake system into contact creating a rattling noise that may be audible by a user, an occupant, or both. These noises when heard by a user may be irritating, may cause concern to a user, or both. Further, this may cause a user to request the manufacturer to spend time and money troubleshooting the noise which may result in repairs and/or replacement of parts. Therefore, it is desirable to have a brake system that does not produce audible noises during movement of the brake system, use, or both.

Examples of braking systems and associated pad clips are disclosed in U.S. Pat. Nos. 6,003,642 and 6,527,090; U.S. Patent Application Publication No. 2011/0120821; and U.S. International Application Publication No. WO2010/005008 all of which are expressly incorporated herein by reference for all purposes. It would be attractive to have a brake system that is free of audible rattling during running, non-braking conditions, or both. What is needed is a device that substantially prevents the brake pads from contacting the support bracket and creating audible noises. What is needed is a device that prevents radial contact between the support bracket and brake pads. What is needed is one or more features of a pad clip that prevent movement of the brake pads radially and/or reduce the force of movement of the brake pads so that the brake pads stop moving before the brake pads contact the support bracket.

SUMMARY

One possible example of the present teachings include: a pad clip comprising: A pad clip comprising: two opposing legs separated by a gap, the two opposing legs comprising: (i) a projection arm including: (A) an upper portion, (B) a lower portion, and (C) a face portion connecting the upper portion and the lower portion together; (ii) a connection arm; and (iii) an abutment arm extending between and connecting the projection arm and the connection arm; wherein the lower portion of the projection arm, the connection arm, or both include an arcuate segment that extends the lower portion, the connection arm, or both towards each other so that when the pad clip is installed in a support bracket a space is formed between the arcuate segment and the support bracket.

One possible embodiment of the present teachings include: a brake system comprising: (a) a support bracket having (i) an abutment on a trailing side and (ii) an abutment on a leading side; wherein the abutment on the trailing side includes a pad clip comprising: (a) a bridge extending over a gap, (b) two opposing legs separated by the gap and connected by the bridge, the two opposing legs comprising: (i) a projection arm including: (A) an upper portion, (B) a lower portion, and (C) a face portion connecting the upper portion and the lower portion together; (ii) a connection arm; and (iii) an abutment arm extending between and connecting the projection arm and the connection arm; wherein the lower portion of the projection arm, the connection arm, or both include an arcuate segment that extends the lower portion, the connection arm, or both towards each other so that when the pad clip is installed in a support bracket the a space is formed between the arcuate segment and the support bracket.

The present teachings provide a brake system that is free of audible rattling during running, non-braking conditions, or both. The present teachings provide a device that substantially prevents the brake pads from contacting the support bracket and creating audible noises. The present teachings provide a device that prevents radial contact between the support bracket and brake pads. The present teachings provide one or more features of a pad clip that prevent movement of the brake pads radially and/or reduce the force of movement of the brake pads so that the brake pads stop moving before the brake pads contact the support bracket.

DETAILED DESCRIPTION

Figure 1:
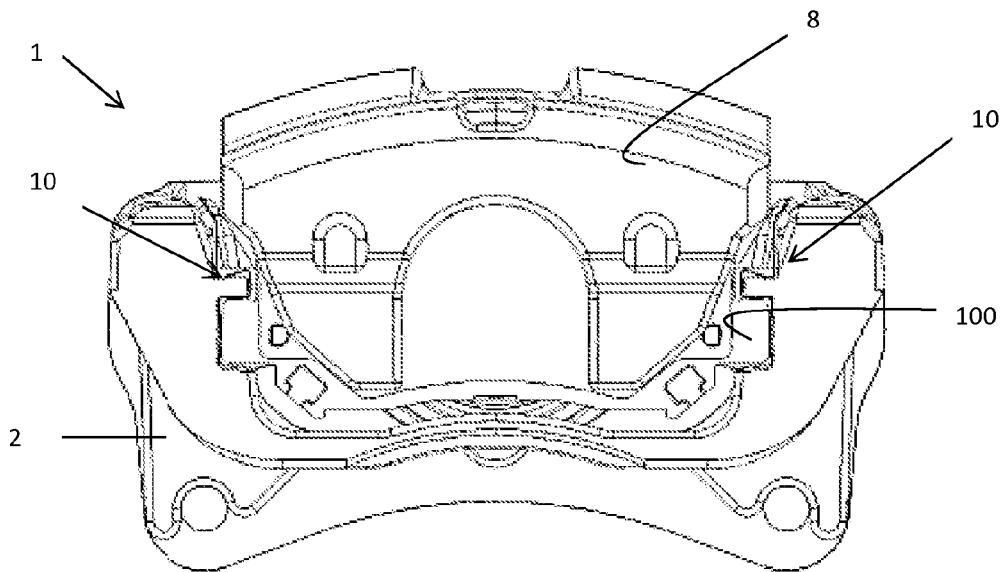
FIG. 1 illustrates a side view of an exemplary brake system including the pad clips of the teachings herein.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a brake system that may be used to create a braking force. The brake system may generally include a rotor, a caliper, one or more brake pads, and a support bracket. The brake system may include one or more pistons. The brake system may include opposing pistons. Preferably, the brake system includes one or more pistons on one side of a rotor so that when the piston moves a brake pad into contact with a rotor, the caliper moves until fingers move an opposing brake pad into contact with an opposing side of the rotor.

The caliper may function to create a friction force during a brake apply. The caliper may include one or more pistons that move during a brake apply to create a friction force. The caliper may include one or more pistons on each side of the caliper so that the caliper is substantially static during a brake apply. The caliper body may include a bridge, one or more fingers, one or more piston bores, or a combination thereof. The one or more piston bores house the one or more pistons and may include any, all, or a combination of a fluid inlet, a closed wail, a front opening, a cylindrical side wall that includes an annular groove near the front opening, and a seal in the annular groove.

The brake system may include one or more brake pads (e.g., an inboard brake pad and an outboard brake pad located on opposing sides of the rotor). One or more of the brake pads may have one or more ears or an area that projects out from the body of the brake pad. An ear of a brake pad may connect the brake pad to the support bracket, directly or indirectly. For example, an ear of the brake pad may connect to the support bracket using a pad clip as described herein, wherein the ear of the brake pad generally fits in the contours of the pad dip to enter the area defined by a projection and an abutment of the support bracket.

The support bracket may function to connect the brake system to a corner module (e.g., a knuckle). The support bracket may be any static part of the brake system. The support bracket may directly or indirectly support the brake pads. The support bracket may include one or more pad clips that assist in holding the one or more brake pads. The caliper and the support bracket may be one unitary piece. Preferably, the support bracket and caliper may be two discrete pieces. The support bracket may connect the caliper indirectly to a corner module. The support bracket may provide support to the caliper so that the caliper moves during a brake apply. The support bracket may be sized so that the caliper extends on both sides of the support bracket and a rotor extends through a center of the support bracket. Preferably, the support bracket includes at least two opposing projections and/or at least two opposing abutments that guide the brake pads during a brake apply and retain the brake pads within the support bracket during non-braking conditions (e.g., running). A pair of brake pads may be used in the brake system, and the pair of brake pads may extend from an abutment on a trailing side of the support bracket to an abutment on a leading side of the support bracket.

The brake pads may be held in communication with the support bracket with one or more pad clips. The one or more pad clips and preferably a plurality of pad clips may function to hold one or more brake pads, allow one or more brake pads to move along an axis of a rotor, create a low friction surface for the brake pads to move along, or a combination thereof. Preferably, the pad clips connect an ear of one or more brake pads to the support bracket. Preferably, the pad clips generally mirror the shape of a portion of the support bracket (e.g., shaped to fit around the at least two opposing projections and/or within the at least two opposing abutments of the support bracket), have a generally complementary shape to the support bracket and/or ear of the brake pad, or both. The pad clip may be made of separate pieces. Preferably, the one or more pad clips are each one unitary piece. Preferably, the brake system includes at least two pad clips. More preferably, a first pad clip is placed on one side (e.g., trailing end) of the one or more brake pads, and a second pad clip is placed on the opposite side (e.g., leading end) of the one or more brake pads. The brake system may include three pad clips. For example, one side may include a pad clip that holds both ears of both brake pads and the opposite side may have two discrete pad clips, each pad clip holding a single brake pad. The brake system may include four pad clips. Two pad clips may be placed on each side of the rotor and two pad clips may be placed on opposite sides of the one or more brake pads. It is contemplated that any of the configurations discussed herein may be employed in one, two, three, four or more pad clip designs.

The one or more pad clips may comprise a bridge extending over a gap (e.g., a gap that the rotor rotates through). The gap may be any size so that a rotor may pass under the bridge. The gap, preferably, is free of any pad clip parts. The height of the bridge may be high enough so that a brake rotor may pass under the bridge and through the gap so that the rotor is free of contact with the bridge. The bridge may have a thickness and/or height that provide stiffness so that the pad clip does not twist and/or move during a brake apply, a brake retraction during brake wear, or a combination thereof. It is contemplated that the one or more pad clips may be free of a bridge.

Thus, two discrete clips may be formed, and the two discrete pad clips without a bridge may be identical in all other aspects to a clip with a bridge.

Each of the one or more pad clips may include one or more legs, preferably that project from the bridge. Therefore, the bridge of the one or more pad clips may connect one or more legs. Preferably, the pad clip includes two opposing legs separated by the gap. The one or more legs may project laterally from the bridge, longitudinally from the bridge, or both. Preferably, the one or more legs may project down, vertically, from the ends of the bridge and away from the bridge, from one or more sides of the bridge and away from the bridge, or a combination thereof from the bridge of the pad clip. Preferably, the one or more legs project out from one or both sides of the bridge. The one or more legs may be planar with the bridge. Preferably, the one or more legs may be substantially planar (e.g., 50 percent or more, 60 percent or more, or 70 percent or more by length) with the bridge and may have one or more curved portions that are not planar with the bridge. The one or more legs may be substantially planar and include one or more substantially perpendicular portions that project away from the legs, the bridge, or both. When more than one leg is present, the legs may be generally parallel, generally symmetrical, generally planar, or a combination thereof relative to each other. The legs may be a single piece of material. The legs may be one or more pieces of material.

The one or more legs may include one or more features that hold the outside of the support bracket so that the pad clip is free of movement during a brake apply, a brake retraction, during brake wear, or a combination thereof. The one or more legs may include one or more features that generally match the contours of the support bracket. The one or more legs may include a portion that projects out from the bridge and includes a "U" shape. For example, the legs may include an angled bracket or contour that may substantially mirror the shape of the projection and/or the abutment of the support bracket.

The legs and the bridge may be made of the same material. The legs and bridge may be made of different materials. Preferably, the pad clip (e.g., legs, bridge, or both) may be made of metal. The pad clip may be made of titanium, aluminum, steel, copper, iron, nickel, cobalt or a combination thereof. More preferably, the legs may be made of stainless steel. Even more preferably, the pad clip may be made of a material that has a 301 3/4H when measured by ASTM A666 or may be SU301-CSP 3/4H when measured by GEIS G4313. Preferably, the pad clip is made of 301 3/4H stainless steel. The pad clip may be made of a material that is resistant to corrosion. The pad clip may be made of any material that may be formed. The pad clip may be made of a material that is deformable. Preferably, the pad clip may be made of a material that is elastically deformable. The pad clip may be formed by any process capable of creating a clip with arcuate portions. The pad clip may be formed by casting, stamping, cutting, bending, molding, deep drawing, spinning, press brake forming, roll forming, ironing, wheeling, incremental sheet forming, decambering, or a combination thereof. Preferably, the pad clip may be made from a metallic sheet, a coil, a roll, or a combination thereof.

The one or more features of the one or more legs may include one or more projection arms that generally holds or surrounds at least a portion of a projection of the support bracket. The one or more projection arms may include an upper portion, a lower portion, and a face portion, where the face portion connects the upper and lower portions. One or more tabs may be located on any part of the pad clip and the one or more tabs may assist in retaining the pad clip in its proper position. The one or more projection arms may have one or more tabs. The one or more tabs may extend from the sides of any portion of the projection arm (e.g., one or more tabs may extend generally perpendicularly from a side of the face portion and contact and secure the projection arm to the projection). The one or more tabs may assist in retaining the pad clip in place so the pad clip does not move during operation.

The upper portion of the projection arm is generally located above the projection of the support bracket when the pad clip is installed in the braking system. The upper portion of the projection arm may have one or more contact points with the projection of the support bracket. For example, the area where the upper portion of the projection arm and the leg portion extending from the bridge connect (e.g., a corner or a bend in the leg) may contact an area of the projection of the support bracket (e.g., the base of the projection). The upper portion of the projection arm may contact the projection along all or a portion of the length of the top of the projection of the support bracket. The pad clip may be connected to the projection of the support bracket at the one or more contact points. The upper portion of the projection arm may be generally flat. The upper portion of the projection arm may generally mirror the shape of the projection. The upper portion of the projection arm may extend away from a portion of the projection of the support bracket. As an example, the upper portion of the projection arm may contact the projection at its base and then extend at an angle of about 90 degrees or less (relative to the projection), or about 45 degrees or less (e.g., about 30 degrees or less, about 20 degrees or less, or even about 10 degrees or less), away from the end of the projection to form a gap between the end of the projection and the area where the upper portion and face portion of the projection arm join. This gap may assist the pad clip in reducing and/or eliminating acceleration of the brake pad to prevent the brake pad from contacting the support bracket. The upper portion of the projection arm may be generally perpendicular to all or a portion of a leg (e.g., about 90 degrees). Preferably, the angle formed between the leg portion extending from the bridge and the upper portion of the projection arm may be about 90 degrees or less.

The upper portion of the projection arm is connected to the face portion of the projection arm. The face portion may function to connect the upper portion and the lower portion of the projection arm, extend around the projection, or both. The face portion may assist in creating a connection between the projection and the pad clip. The face portion may allow for the upper portion, the lower portion, or both to be movable relative to the projection while a secured connection is maintained. The face portion may have a generally complementary shape to the end of the projection, a shape that generally mirrors the shape of the end of the projection of the support bracket, or both. The face portion may be linear. The face portion may have one or more curves. The face portion may have a length greater than or about equal to the length of the end of the projection. The face portion of the projection arm is preferably located parallel to the end of the projection of the support bracket. For example, if the projection has a generally flat end, the face portion may also be generally flat. The face portion may have one or more contact points with the end of the projection of the support bracket. The face portion may also instead make no direct contact with the end of the projection, be free of contact with the projection, or both.

The face portion of the projection arm may connect the upper portion of the projection arm and the lower portion of the projection arm. The lower portion of the projection arm may function to hold a brake pad in place, prevent contact between the support bracket and a brake pad, reduce a velocity of a brake pad towards the support bracket, decelerate a brake pad as it moves towards a support bracket, or a combination thereof. The lower portion may extend along an under side of a projection, proximate to an ear of a brake pad, between the support bracket and a brake pad, or a combination thereof. The lower portion of the projection arm may be located adjacent the underside of the projection of the support bracket. The lower portion of the projection arm may have one or more contact points, two or more contact points, or three or more contact points with the projection of the support bracket. For example, the area where the lower portion of the projection arm and an abutment arm connect (e.g., a corner or a bend in the leg) may contact an area on the underside of the projection of the support bracket (e.g., at the base of the projection). The pad clip may be connected to the projection of the support bracket at the one or more contact points. The lower portion of the projection arm may be generally flat and/or linear. The lower portion of the projection arm may have one or more bends, curves, or contours. The lower portion of the projection arm may have one or more linear segments. Preferably, the lower portion includes one or more arcuate segments that extend away from the projection. However, the lower portion may include two or more arcuate sections or even three or more arcuate segments. The one or more arcuate segments may be convex and extend away from the projection, concave and extend towards the projection, or both, The lower portion of the projection arm may be generally parallel with the underside of the projection of the support bracket. Preferably, the lower portion of the projection arm may have one or more arcuate segments. The lower portion of the projection may be generally perpendicular to the abutment. The angle formed between the lower portion of the projection arm and the abutment arm may be about 90 degrees, or preferably about 90 degrees or less. The angle formed between the lower portion and the abutment arm may be a continuously changing curvature, may be an arcuate segment, may have a radius, or a combination thereof The lower portion of the projection arm may be connected to an abutment arm. The abutment arm may function to create a sliding surface for the brake pad during axial movement, act as a barrier between the abutment and the brake pad, prevent the brake pad from directly and/or indirectly contacting the support bracket, or a combination thereof. The abutment arm may extend between the projection arm and a connection arm. The abutment arm preferably has a length substantially similar to the length of the abutment of the support bracket or smaller. The abutment arm may be generally parallel to the abutment of the support bracket. The abutment arm may be generally angled away from the abutment of the support bracket (e.g., creating a gap between the abutment arm and abutment, wherein the gap distance generally increases as the abutment arm approaches the connection arm or the projection arm). The abutment arm may extend away from the abutment at a sufficient angle so that during a braking event the one or more brake pads are moved along the abutment arm to generate a braking force, to retract to a running position, or both. The abutment arm may extend away from the abutment at a sufficient angle so that the abutment arm produces a force on the brake pad during running conditions so that the brake pad is substantially prevented from moving, the brake pad is substantially prevented from rattling, the brake pad is substantially prevented from contacting the abutment, or a combination thereof and noise, vibration, and harshness (NVH) are substantially reduced and/or eliminated. For example, the abutment arm may extend at an angle of about 5 degrees or more, about 10 degrees or more, or about 15 degrees or more away from the abutment. The abutment arm may extend at an angle of about 60 degrees or less, about 45 degrees or less, or about 30 degrees or less away from the abutment. The abutment arm may be substantially flat and/or linear. The abutment arm may have one or more bends, curves, or contours. The abutment arm may have one or more linear segments. Preferably, the abutment arm includes one or more arcuate segments. The one or more arcuate segments may be convex and extend away from the abutment, concave and extend towards the abutment, or both.

The abutment arm may have one or more contact points with the abutment of the support bracket, The pad clip may be connected to the support bracket at the one or more contact points between the abutment and the abutment arm. The abutment arm may have a cantilever connection with the lower portion of the projection arm so that the abutment arm extends in front of the abutment but is free of contact with the abutment when a brake pad is not installed, when a brake pad is installed, or both. The abutment arm may contact the abutment of the support bracket during non-braking or running conditions and/or as a brake pad approaches the support bracket. The abutment arm may contact the abutment of the support bracket in the general area where the projection and abutment connect (e.g., the area where the abutment arm and the lower portion of the projection arm connect). The abutment arm may contact the abutment of the support bracket where the abutment arm and the connection arm connect (e.g., as a first point of contact, or preferably a second point of contact). It is possible that the abutment arm will not contact the abutment where the abutment arm and the connection arm connect, but when the ear of the brake pad approaches the support bracket, the pad clip may flex to absorb the movement of the brake pad or reduce or stop its movement. It is possible that contact may then be made between the abutment and the abutment arm near the connection arm to reduce the acceleration of the brake pad and to reduce or eliminate noise, vibration, and harshness that previously occurred as a result of two components of the braking system contacting each other (i.e., a brake pad and the support bracket).

The one or more legs may further comprise a connection arm, which may be connected to the abutment arm opposite the lower portion of the projection. The connection arm may be located at the end of a leg, opposite the bridge. The connection arm may be generally flat and/or linear. The connection arm may have one or more bends, curves, or contours. The connection arm may have one or more linear segments. The connection arm may have a shape to hold the ear of the brake pad in place. The connection arm may have a shape that generally mirrors the shape of the ear of the brake pad. The connection arm may include one or more arcuate segments. The one or more arcuate segments may be convex and extend away from the support bracket and toward the projection, concave and extend towards the support bracket, or both. The connection arm may be substantially parallel to the upper portion of the projection arm, the lower portion of the projection arm, or both. The connection arm, or a portion of the connection arm, such as a terminal end of the connection arm, may instead be angled upward toward the projection arm. The connection arm may extend at an angle relative to the abutment of the support bracket. The angle may be an arcuate angle.

The pad clip may comprise one or more arcuate segments. Any, all, or combination of the lower portion of the projection arm, the connection arm, and the abutment arm may include one or more arcuate segments. The arcuate segments function to create a distance between the brake pads and the support bracket, to absorb the forces of motion of the brake pads towards the support bracket, provide a friction fit for the ear of the brake pad, or a combination thereof so that movement of the brake pads radially, tangentially, or both are substantially reduced and/or eliminated before the brake pads contact the support bracket. The one or more arcuate segments may function to provide a non-linear stiffness to the pad clip so that as the brake pad moves towards the support bracket the one or more arcuate segments gradually become stiffer so that acceleration, velocity, or both of the brake pad is reduced and/or eliminated. Stated another way, the amount of force required to move the one or more arcuate segment increases exponentially as the portion of the arcuate segment approaches the support bracket. For example, initially a force of 1 N may be required to move the arc segment and when the height is reduced by 50 percent a force of 3 N may be required to move the arc segment and when the height is reduced by 75 percent a force of 7 N may be required to move the arcuate segment. The arcuate segments on the lower portion of the projection arm, connection arm, or both function to prevent a force, which is substantially parallel to the abutment of the support bracket, of the brake pads from moving the brake pads into contact with a part of the support bracket complementary to the lower portion, the connection arm, or both, of the pad clip. The lower portion of the projection arm may include an arcuate segment that extends the lower portion of the projection toward the connection arm. The connection arm may include an arcuate segment that extends the connection arm toward the lower portion of the projection arm. Both the lower portion of the projection arm and the connection arm may have arcuate segments that extend toward each other. The abutment arm may include an arcuate segment that extends a portion of the abutment arm away from the abutment of the support bracket. The one or more arcuate segments may form a space (e.g., a gap) between the arcuate segment and the support bracket when the pad clip is installed in the support bracket.

The one or more arcuate segments hold the ear of the brake pad in place. The one or more arcuate segments may reduce and/or prevent movement of the brake pad, which may thereby reduce and/or prevent contact between the brake pad and the support bracket. Movement may be considered reduced when the speed of the brake pad is kept from increasing toward a portion of the support bracket in any direction, when the speed of the brake pad is slowed as it approaches the support bracket, or both. Movement may be reduced, for example, by slowing the acceleration of the brake pad, increasing friction between the brake pad and the pad clip, flexing the support bracket on contact from the brake pad, causing a gap between the pad clip and the support bracket to decrease (e.g., causing the maximum height of the arcuate segment to decrease upon impact or pushing a portion of the leg closer to the support bracket), or the like. The arcuate segment of the abutment arm may also reduce and/or prevent motion of the pad clip as it approaches the support bracket and/or reduce or prevent contact between the brake pad and the abutment.

The one or more arcuate segments of the pad clip may substantially reduce and/or eliminate noise, vibration, harshness, or a combination thereof caused by two or more components of the braking system contacting each other. The one or more arcuate segments may reduce noise by slowing movement of the brake pad, reducing acceleration of the brake pad as it moves towards the support bracket, preventing contact between the brake pad and the support bracket, or a combination thereof. The region between the projection arm and the connection arm may be configured to receive an ear of a brake pad. The arcuate segments in the lower portion of the projection arm, the connection arm, or both may resist movement of the brake pad so that contact between the ear of the brake pad and the support bracket is substantially eliminated. The arcuate segments in the lower portion of the projection arm, the connection arm, or both may resist movement of the brake pad so that acceleration of the ear of the brake pad reduces as the brake pad approaches the support bracket. The arcuate segment in the abutment arm may also resist movement of the brake pad so the contact between the ear of the brake pad and support bracket is substantially eliminated and/or to reduce the acceleration of the ear of the brake pad as it approaches the support bracket. The brake system including one or more pad clips with one or more arcuate segments may produce a noise of about 20 sone or less, about 15 sone or less, preferably about 10 sone or less, or more preferably about 8 sone or less, or even more preferably about 5 sone or less.

The shape of the arcuate segments may impact the number of contact points between the pad clip legs and the support bracket. The shape of the arcuate segments may also impact the instances when contact is made between the pad clip legs and the support bracket (i.e., in some instances, contact made only be made when the pad clip is slowing acceleration of the brake pad). The shape of the arcuate segments may be chosen based on the shape and/or size of the ear of the brake pad or based on the desired noise, vibration, and harshness properties. For example, the maximum height of the arcuate segment may depend on the dimensions of the ear of the brake pad, wherein the arcuate segments provide a snug fit for the ear. The one or more arcuate segments may extend at an angle relative to a plane that is coplanar with the bridge, an abutment of the support bracket, or both.

The one or more arcuate segments may have a maximum height at a central location of each of the arcuate segments, along a length of each arm, at the center point of each arm, or a combination thereof. For example, an arcuate segment of the lower portion of the projection arm may be halfway between a connection point with the face portion of the projection arm and a connection point of the abutment arm. As another example, an arcuate segment of the abutment arm may have a maximum height half way between a connection point with the lower portion of the projection arm and a connection point with the connection arm. As another example, an arcuate segment of the connection arm may be located half way between a connection point with the abutment arm and a terminal end of the connection arm. The arcuate segment may be along the entire length of the arm, or the arcuate segment may be located between two points along the arm (i.e., a chord). The maximum height may be at the center point of the chord along the arm. The maximum height may be at the center point between two contact portions of the arm and the support bracket. The arc segment may be substantially symmetrical, asymmetrical, bell curve shaped, tear drop shaped, have a steep slope on one end and a gradual slope on the opposing end, or a combination thereof. The distance between one endpoint of the arcuate segment and the maximum point of the arcuate segment may be greater than the distance between the other endpoint of the arcuate segment and the maximum point of the arcuate segment. The location of the point of maximum height of the arcuate segment may be placed at an area of the arm that receives the most force from a brake pad. For example, if the brake pad is known to contact a particular point or area most frequently in a traditional brake system, the maximum height point may be in that area to absorb the force or prevent movement of the brake pad. The arm may have more than one arcuate segment. The arm may have a generally sinusoidal shape (e.g., a connection arm may have a peak extending toward the lower portion of the projection arm and a valley extending toward a connection arm plane, which may or may not create another contact point with the support bracket). The arcuate segment chord may have a length X, with an arc length about 1.1X or more, about 1.2X or more, about 1.3X or more, or even about 1.4X or more. The arcuate segment chord may have a length X, with an arc length of about 5X or less, about 4X or less, about 3X or less, or about 2X or less. The arc length may be calculated using the following formula: Arc Length=$2\pi R*(C/360)$, where C=the angle produced by the arc in degrees, which is 180, and R=the radius of the circle.

A lower portion of the projection arm may have an arcuate segment with a length to height ratio of about 2:1 or more, preferably about 3:1 or more, more preferably about 4:1 or more, and even more preferably about 5:1 or more. The arcuate segment of the lower portion of the projection arm may have a length to height ratio of about 25:1 or less, preferably about 20:1 or less, more preferably about 15:1 or less, and even more preferably about 10:1 or less. The height may be measured from the distance from a projection plane to the highest point of the arcuate segment of the projection arm. A connection arm may have an arcuate segment with a length to height ratio of about 2:1 or more, preferably about 3:1 or more, more preferably about 4:1 or more, and even more preferably about 5:1 or more. The arcuate segment of the connection arm may have a length to height ratio of about 25:1 or less, preferably about 20:1 or less, more preferably about 15:1 or less, and even more preferably about 10:1 or less. The height may be measured from the distance from a connection arm plane to the highest point of the arcuate segment of the connection arm. An abutment arm may have an arcuate segment with a length to height ratio of about 2:1 or more, preferably about 3:1 or more, more preferably about 5:1 or more, or even more preferably about 7:1 or more. The arcuate segment of the abutment arm may have a length to height ratio of about 25:1 or less, preferably about 20:1 or less, more preferably about 15:1 or less, and even more preferably about 10:1 or less. The height may be measured from the distance from an abutment plane to the highest point of the arcuate segment of the abutment arm. The height of the arcuate segment may be about 0.25 mm or more, about 0.5 mm or more, or preferably about 1 mm or more. For example, a height of the lower portion arcuate segment away from the support bracket may be about 1 mm or more. The height of the arcuate segment may be about 5 mm or less, about 4 mm or less, or about 3 mm or less.

Preferably, the abutment of the support bracket is a generally flat, vertical surface. An abutment plane coplanar with the support bracket abutment can be used to define the angle of the abutment arm of the pad clip relative to the abutment and abutment plane. A plane extending between the endpoints of the arcuate segment (e.g., a tangent line between the two lowest points of the arcuate segment) of the abutment arm may create an abutment arm plane. The abutment arm plane may be used as the other line to define the angle of the abutment arm relative to the abutment plane. The vertex of the angle is preferably a contact point between the abutment arm and the abutment of the support bracket or the intersection of the abutment arm plane and the abutment plane. As a general example, not as a limitation to the pad clip disclosed herein, with a pad clip having a contact point between the abutment arm and the abutment plane adjacent the base of the projection, the abutment plane serves as one ray or line segment of the angle, and the abutment arm plane serves as the other ray or line segment of the angle. Preferably, the angle between the abutment plane and the abutment arm plane is less than 90 degrees; more preferably, the angle between the abutment plane and the abutment arm plane is less than 45 degrees (e.g., less than 30 degrees, less than 20 degrees, and even less than 10 degrees). The angle between the abutment plane and abutment arm plane may be dependent upon the size and/or shape of the ear of the brake pad, the forces exerted or the motion by the brake pad, or the type of material used in constructing the pad clip to reduce the forces of motion of the brake pad to reduce or prevent audible rattling.

The underside of the projection may be generally flat. A projection plane may be coplanar with the projection of the support bracket and may be used to define the height of the arcuate segment. The projection plane may instead be defined by extending through two points of the lower portion of the projection arm (e.g., a plane extending between the two endpoints of the arcuate segment).

A connection arm plane may be used to define the height of the arcuate segment of the connection arm. The connection arm plane may be defined by extending through two points of the connection arm (e.g., a plane extending through the two endpoints of the arcuate segment of the connection arm).

A tangent plane coplanar with the support bracket can be used to define an angle of the connection arm of the pad clip relative to the support bracket and tangent plane. The tangent plane may lie tangent to the endpoint of the arcuate segment closest to the terminal end of the connection arm, and where the tangent plane intersects he connection arm plane (e.g., at this endpoint) may serve as the vertex for the angle. The terminal end may extend upward from the endpoint of the arcuate segment closest to the terminal end to provide additional support to the ear of the brake pad and reduce movement of the brake pad within the pad clip and support bracket. Preferably, the angle between the tangent plane and the connection arm plane is less than 90 degrees; more preferably, the angle between the tangent plane and the connection arm plane is less than 45 degrees (e.g., less than 30 degrees, less than 20 degrees, and even less than 10 degrees). It is also possible that the angle between the tangent plane and connection arm plane is 0 degrees. The angle between the tangent plane and connection arm plane may be dependent upon the size and/or shape of the ear of the brake pad, the forces exerted or the motion by the brake pad, or the type of material used in constructing the pad clip to reduce the forces of motion of the brake pad to reduce or prevent audible rattling.

FIG. 1 illustrates a front view of a brake assembly 1. The brake assembly 1 includes a support bracket 2 and a caliper 8 with brake pads 100 and pad clips 10 between the support bracket 2 and brake pads 100.

Figure 2:
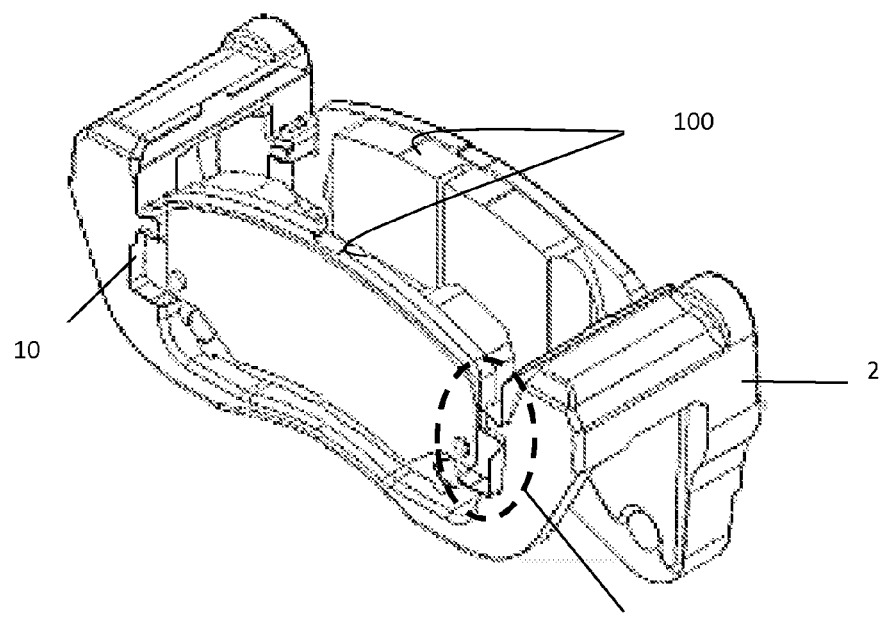
FIG. 2 illustrates a partial brake system including a pad clip of the teachings herein.

FIG. 2 illustrates a perspective view of a support bracket 2 with a pair of brake pads 100 installed in the support bracket 2. A pad clip 10 is located at each end of the brake pads 100 between the brake pads 100 and the support bracket 2.

Figure 3:
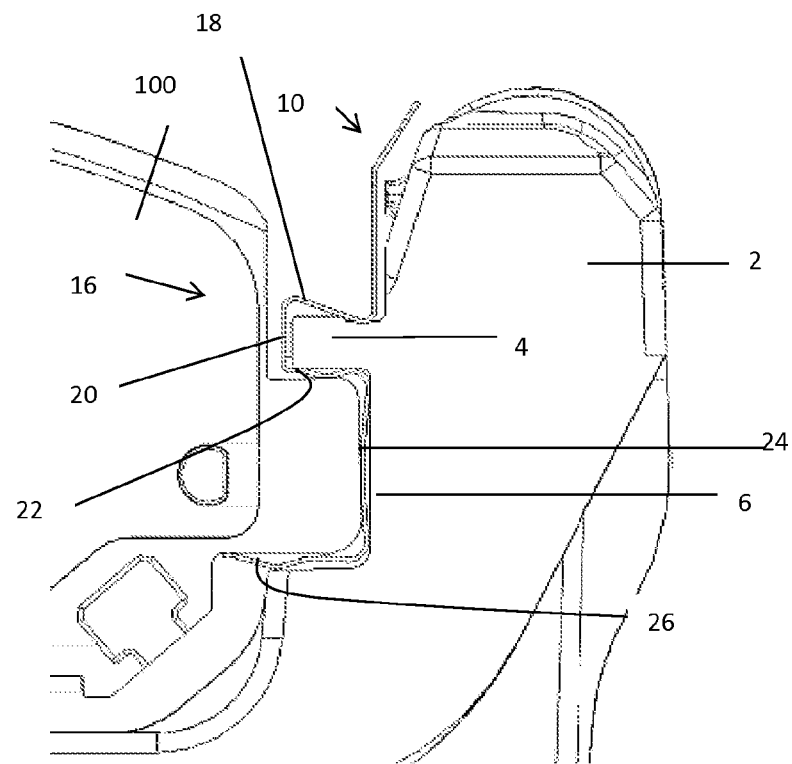
FIG. 3 illustrates an enlarged view of the circled portion in FIG. 2 showing the pad clip.

FIG. 3 illustrates close-up view of a pad clip 10 disposed between a support bracket 2 and an ear of a brake pad 100 of FIG. 2. The support bracket 2 includes a projection 4 that is in communication with a projection arm 16 of the pad clip 10 and an abutment 6 that is located proximate to the abutment arm 24. The projection arm 16 includes an upper portion 18 and a lower portion 22 connected by a face portion 20.

Figure 4:
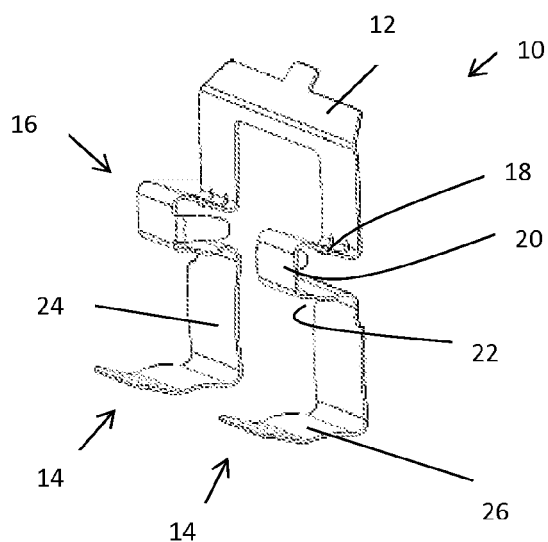
FIG. 4 illustrates a perspective view of an exemplary pad clip of the teachings herein.

FIG. 4 illustrates a perspective view of a pad clip 10. The pad clip 10 includes a pair of legs 14 that are connected by a bridge 12. Each leg 14 includes a projection arm 16, an abutment arm 24, and a connection arm 26. The projection arm 16 includes an upper portion 18 and a lower portion 22 connected by a face portion 20.

Figure 5:
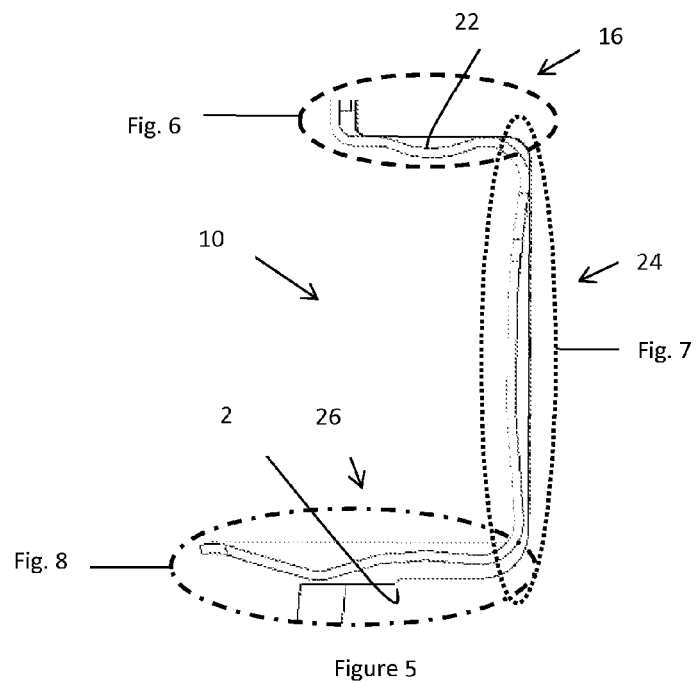
FIG. 5 illustrates a side view of an exemplary pad clip of the teachings herein.

FIG. 5 illustrates a close-up side view of a bottom portion of a pad clip 10. The pad clip 10 is located within a support bracket 2. The lower portion 22 of the projection arm 16 is connected to a connection arm 26 by an abutment arm 24.

Figure 6:
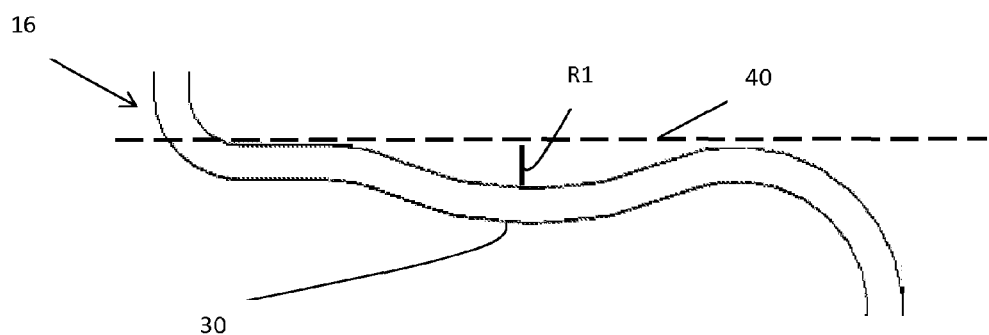
FIG. 6 illustrates an enlarged view of the portion of FIG. 5 in the dashed oval showing an exemplary projection arm of a pad clip of the teachings herein.

FIG. 6 illustrates a close-up view of a projection arm 16 of FIG. 5. The projection arm 16 includes an arcuate segment 30 that extends away from a projection plane 40 a distance (R1). As illustrated, the projection plane 40 extends across the projection arm 16 at two points.

Figure 7:
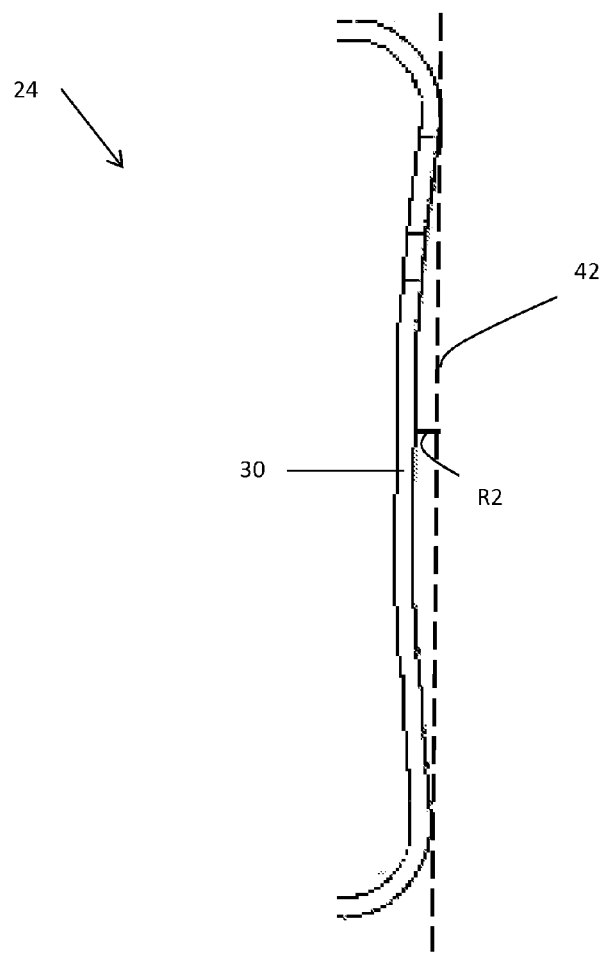
FIG. 7 illustrates an enlarged view of the portion of FIG. 5 in the dotted oval showing an exemplary abutment arm of a pad clip of the teachings herein.

FIG. 7 illustrates a close up view of the abutment arm 24 of FIG. 5. The abutment arm 24 includes an arcuate segment 30. The arcuate segment 30 has an arc that extends a distance (R2) from an abutment arm plane 42, and abutment arm plane 42 extends across the abutment arm 24 at two points.

Figure 8:
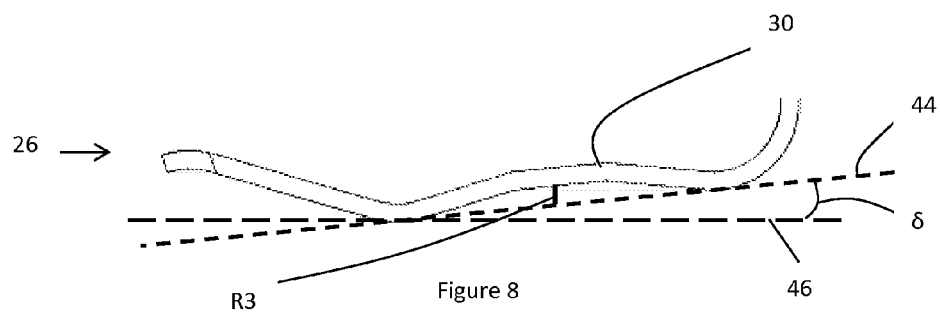
FIG. 8 illustrates an enlarged view of the portion of FIG. 5 in the dashed and dotted oval showing an exemplary connection arm of a pad clip of the teachings herein.

FIG. 8 illustrates a close up view of the connection arm 26 of FIG. 5. The connection arm 26 includes an arcuate segment 30. The arcuate segment 30 has an arc that extends a distance (R3) above a connection arm plane 44. The connection plane 44 extends across the connection arm 26 at two points. A tangent plane 46 extends substantially parallel to the support bracket (not shown) and the connection arm 26 and connection arm plane 44 extend at an angle (δ) relative to the tangent plane 46.

Figure 9:
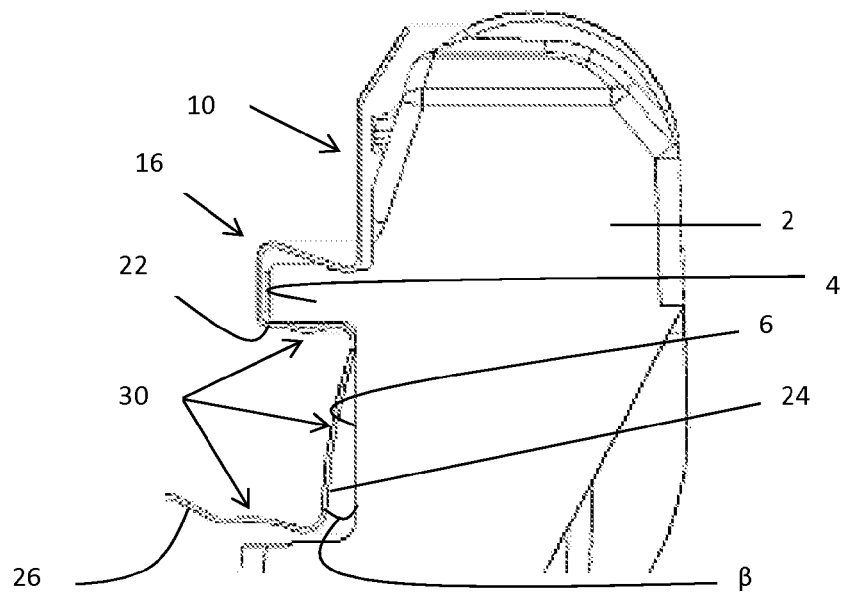
FIG. 9 illustrates a side view of an exemplary pad clip of the teachings herein.

FIG. 9 illustrates a side view of another example of a pad clip 10 connected to a support bracket 2. The pad clip 10 includes a projection arm 16 that is connected to a projection 4 of the support bracket 2. The projection arm 16 includes a lower portion 22 with an arcuate segment 30. The projection arm 16 is connected to an abutment arm 24 that is located proximate to an abutment 6 of the support bracket 2. The abutment arm 24 extends at an angle (β) away from the abutment 6 when a pad brake pad is not installed and is moved towards the abutment 6 when a brake pad is installed so that under normal operating conditions the brake pad slides along the abutment arm 24 and the angle (β) of the abutment arm 24 applies a force against the brake pad to reduce and/or eliminate NVH. The abutment arm 24 includes an arcuate segment 30, and the abutment arm 24 is connected to a connection arm 26 that includes an arcuate segment.

Figure 10:
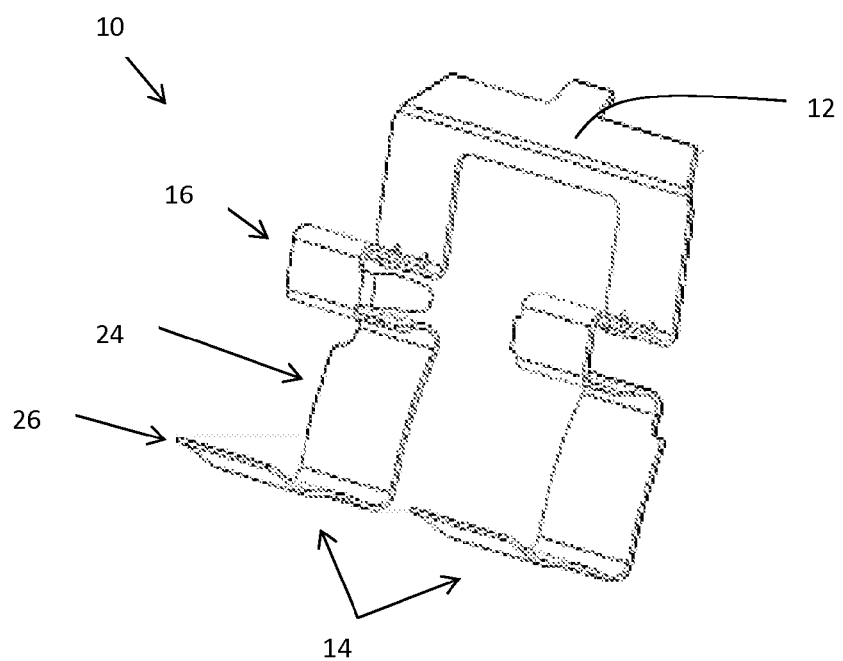
FIG. 10 illustrates a perspective view of an exemplary pad clip of the teachings herein.

FIG. 10 illustrates a perspective view of one example of a pad clip 10. The pad clip 10 includes two opposing legs 14 that are connected by a bridge 12. Each of the legs 14 include a projection arm 16 and a connection arm 26 that are connected by an abutment arm 24.

Figure 11:
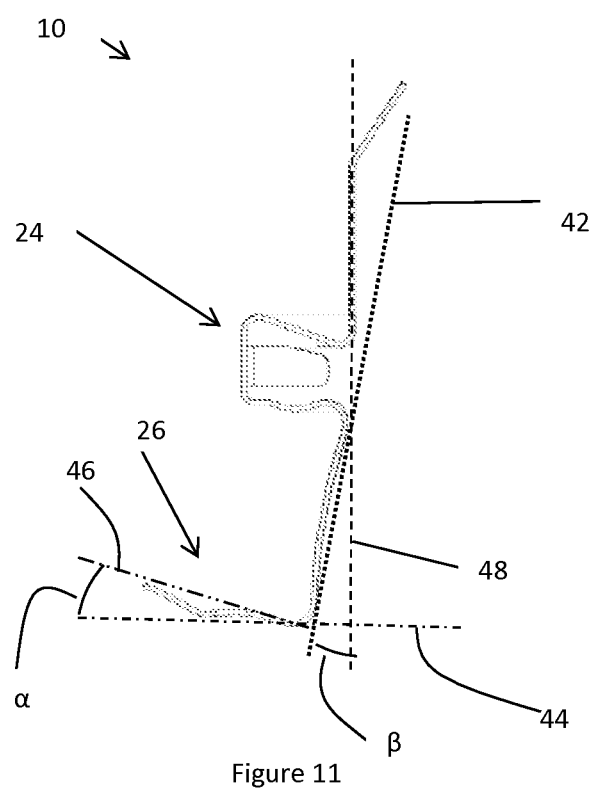
FIG. 11 illustrates a side view of n exemplary pad clip of the teachings herein.

FIG. 11 illustrates a side view of a pad clip 10. The abutment arm 24 extends substantially along an abutment plane 48 and the abutment arm plane 42 extends at an angle (β) relative to an abutment plane 48 that is coplanar with a support bracket abutment (not shown). The connection arm 26 extends substantially along a connection arm plane 44. The connection arm plane 44 extends at an angle (α) relative to tangent plane 46.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

We claim:

1. A pad clip comprising:
   two opposing legs separated by a gap, the two opposing legs comprising:
   i. a projection arm including:
      A. an upper portion,
      B. a lower portion, and
      C. a face portion connecting the upper portion and the lower portion together;
   ii. a connection arm; and
   iii. an abutment arm extending between and connecting the projection arm and the connection arm;
   wherein the lower portion of the projection arm, the connection arm, or both include an arcuate segment that extends the lower portion, the connection arm, or both towards each other so that when the pad clip is installed in a support bracket a space is formed between the arcuate segment and the support bracket;
   wherein the abutment arm extends at an angle relative to a plane that is coplanar with an abutment of the support bracket; and
   wherein the connection arm extends at an angle relative to the abutment of the support bracket and the angle is an acute angle.

2. The pad clip of claim 1, wherein both the lower portion and the connection arm include an arcuate segment.

3. The pad clip of claim 2, wherein a region between the projection arm and the connection arm is configured to receive an ear of a brake pad, and
   wherein the arcuate segment in the lower portion and the connection arm resists movement of the brake pad so that contact between the ear of the brake pad and the support bracket is substantially eliminated.

4. The pad clip of claim 2, wherein a region between the projection arm and the connection arm is configured to receive an ear of a brake pad, and
   wherein the arcuate segment in the lower portion and the connection arm resists movement of the brake pad so that acceleration of the ear of the brake pad reduces as the brake pad approaches the support bracket.

5. The pad clip of claim 2, wherein a region between the projection arm and the connection arm is configured to receive an ear of a brake pad, and
   wherein the arcuate segment in the lower portion and the connection arm resists movement of the brake pad so that acceleration of the ear of the brake pad is eliminated before the brake pad contacts the support bracket.

6. The pad clip of claim 1, wherein the arcuate segment of the lower portion of the projection arm has a length to height ratio of about 5:1 or more.

7. The pad clip of claim 6, wherein the arcuate segment of the connection arm has a length to height ratio of about 5:1 or more.

8. The pad clip of claim 7, wherein the abutment arm includes an arcuate segment that extends away from the support bracket.

9. The pad clip of claim 1, wherein the abutment arm includes an arcuate segment that extends away from the support bracket.

10. The pad clip of claim 9, wherein the arcuate segment of the abutment arm has a length to height ratio of about 7:1 or more.

11. The pad clip of claim 1, wherein the abutment arm extends away from an abutment of a support bracket.

12. The pad clip of claim 1, wherein a maximum height of the arcuate segment of the lower portion of the projection arm is half way between a connection point with the face portion of the projection arm and a connection point of the abutment arm.

13. The pad clip of claim 1, wherein a maximum height of the arcuate segment of the connection arm is located half way between a connection point with the abutment arm and a terminal end of the connection arm.

14. The pad clip of claim 1, wherein the arcuate segment of the connection arm has a length to height ratio of about 5:1 or more.

15. A brake system comprising:
 a. a support bracket having;
  i. an abutment on a trailing side and
  ii. an abutment on a leading side;
 wherein the abutment on the trailing side includes a pad clip comprising:
 a. a bridge extending over a gap,
 b. two opposing legs separated by the gap and connected by the bridge, the two opposing legs comprising:
  i. a projection arm including:
   A. an upper portion,
   B. a lower portion, and
   C. a face portion connecting the upper portion and the lower portion together;
  ii. a connection arm; and
  an abutment arm extending between and connecting the projection arm and the connection arm;
 wherein the lower portion of the projection arm, the connection arm, or both include an arcuate segment that extends the lower portion, the connection arm, or both towards each other so that when the pad clip is installed in a support bracket the a space is formed between the arcuate segment and the support bracket;
 wherein the abutment arm extends at an angle relative to a plane that is coplanar with an abutment of the support bracket; and
 wherein the connection arm extends at an angle relative to the abutment of the support bracket and the angle is an acute angle.

16. The brake system of claim 15, wherein a pair of brake pads extend from the abutment on the trailing side to the abutment on the leading side.

17. The brake system of claim 16, wherein the pad clip includes a region between the lower portion of the projection arm and the connection arm that receives the pair of brake pads.

18. The brake system of claim 17, wherein the arcuate segment on the lower portion and the connection arm substantially prevent a force, substantially parallel to the abutments of the support bracket, of the brake pads from moving the brake pads into contact with a part of the support bracket complementary to the lower portion, the connection arm, or both of the pad clip.

19. The brake system of claim 15, wherein a height of the lower portion arc segment away from the support bracket is about 1 mm or more.

20. The brake system of claim 15, wherein the arcuate segment has a chord having a length X and an arc length is about 1.1X or more.

* * * * *